United States Patent
Jia et al.

(10) Patent No.: US 9,250,059 B2
(45) Date of Patent: Feb. 2, 2016

(54) DETECTION DEVICES AND METHODS USING DIFFRACTION WAVEFRONT OF A PINHOLE STITCHING MEASUREMENT OF SURFACE SHAPE

(71) Applicant: Institute of Optics and Electronics, Chinese Academy of Sciences, Chengdu (CN)

(72) Inventors: Xin Jia, Chengdu (CN); Jiajun Xu, Chengdu (CN); Fuchao Xu, Chengdu (CN); Weimin Xie, Chengdu (CN); Tingwen Xing, Chengdu (CN)

(73) Assignee: Institute of Optics and Electronics, Chinese Academy of Science, Chengdu (CN)

( * ) Notice: Subject to any disclaimer, the term of this patent is extended or adjusted under 35 U.S.C. 154(b) by 0 days.

(21) Appl. No.: 14/695,590

(22) Filed: Apr. 24, 2015

(65) Prior Publication Data

US 2015/0362308 A1    Dec. 17, 2015

(30) Foreign Application Priority Data

Jun. 14, 2014   (CN) .......................... 2014 1 0264644

(51) Int. Cl.
| | |
|---|---|
| *G01B 11/02* | (2006.01) |
| *G01B 9/02* | (2006.01) |
| *G01B 11/24* | (2006.01) |

(52) U.S. Cl.
CPC ........ *G01B 9/02038* (2013.01); *G01B 9/02001* (2013.01); *G01B 11/2441* (2013.01)

(58) Field of Classification Search
CPC .................................................. G01B 9/02038
USPC ......................................................... 356/511
See application file for complete search history.

(56) References Cited

U.S. PATENT DOCUMENTS

2006/0146342 A1* 7/2006 Doerband .......... G01B 11/2441
                                                          356/512
2008/0043247 A1* 2/2008 Arnold ............... G01B 11/2441
                                                          356/512

(Continued)

OTHER PUBLICATIONS

Medecki, H. et al., *Phase-Shifting Point Diffraction Interferometer*, Optics Letters, vol. 21, No. 1 (Oct. 1, 1996) 1526-1528.

*Primary Examiner* — Tarifur Chowdhury
*Assistant Examiner* — Omar Nixon
(74) *Attorney, Agent, or Firm* — Alston & Bird LLP

(57) ABSTRACT

The present disclosure provides detection devices and methods using a diffraction wavefront of a pinhole stitching measurement of surface shape. The light emitted from the laser passes through a filter hole, a first condenser lens, a spatial filter, a beam expander, a half wave plate, a λ/4 wave plate, an attention plate and then is transmitted through a beam splitter, reflected by a reflecting mirror and is irradiated onto an pinhole through a first optical adjustable shelf and a second set of condenser lens. A part of diffraction light generated by the pinhole is irradiated to the mirror to be measured; the light reflected by the mirror to be measured is reflected by a frame of the pinhole and generate a diffraction fringe along with another part of the diffraction wavefront of the pinhole. The interference fringe is focused by the third set of condenser lens on the third optical adjustable shelf and is collected by the CCD detector. The mirror to be measured is positioned on the second optical adjustable shelf and may be moved along a normal direction of the mirror to be measured to implement an annular aperture stitching measurement. Meanwhile, the first optical adjustable shelf may be rotated and moved in translation to measure the mirror by a scanning sub apertures stitching measurement.

9 Claims, 4 Drawing Sheets

(56) References Cited

U.S. PATENT DOCUMENTS

2009/0079992 A1* 3/2009 Doerband .......... G01B 11/2441 356/496

2012/0330609 A1* 12/2012 Arnold .................. G01B 9/021 702/167

* cited by examiner

S1: the mirror to be measured is positioned on the second optical adjustable shelf to obtain information about interference fringe of the diffraction spherical wave generated by a pinhole in a pinhole substrate and light reflected by tch mirror to be measured, interference fringes is resolved in the use of phase shifting method, and data at the Sub-aperture is recorded by data processing

↓

S2: the mirror to be measured is positioned on the second optical adjustable shelf, the first optical adjustable shelf is moved and rotated; the mirror to be measured is tested by utilizing the diffraction spherical wave generated by the pinhole to scan and stitch; meanwhile, the third optical adjustable shelf is adjusted so that the third set of condenser lens and the CCD detector are able to receive information about the interference fringe; and the phase shift method is used to resolve the interference fringe and different data for different sub-apertures are recorded

↓

S3: the whole surface shape is resolved by utilizing a stitching algorithm based on the resolved data about the surface shape

Fig.7

DETECTION DEVICES AND METHODS USING DIFFRACTION WAVEFRONT OF A PINHOLE STITCHING MEASUREMENT OF SURFACE SHAPE

This application claims priority to Chinese Patent Application No. 201410264644.1, filed on Jun. 14, 2014, entitled "Detection Devices and Methods Using Diffraction Wavefront of a Pinhole Stitching Measurement of Surface Shape," which application is incorporated herein in its entirety by reference.

TECHNICAL FIELD

The present invention relates to field of optically detecting a surface shape, in particularly, to detection devices and methods using diffraction wavefront of a pinhole stitching measurement of surface shape.

BACKGROUND

A point diffraction interferometer (PDI) utilizes a standard reference spherical wave generated by a diffraction of a pinhole to implement an interference measurement. The measuring method by joining sub-apertures pinhole divides the measured surface to be a plurality of sub-apertures pinhole to be tested and then stitched, which may improve the lateral resolution of detection.

The proposal of the point diffraction interferometer solves a problem of machining the reference surface in a measurement with a high precision. Its primary feature is not to utilize a conventional reference surface, from the point of view of wave optics, which eliminates the limitation of the machining level of the reference surface on the measuring precision by utilizing a diffraction of a pinhole to generate an ideal reference spherical wave and makes it possible for a measurement with a high precision in scale of sub-nanometer.

In 1933, W. Linnk firstly propose to utilize an ideal spherical wave generated by a diffraction of a pinhole as a reference wavefront of the interferometer to provide a preform of a point diffraction interferometer. However, due to technical limitation at that time, it is not actually applied to measurement. In 1975, R. N. Smartt and W. H. Steel formally set forth a principle and application of a point diffraction interferometer in their publications and establish a basis for the development of a modern point diffraction interferometer. Their proposed point diffraction interferometer has a main portion of a thin film with a transmissivity of about 1% on which there is a very small pinhole. The lower transmissivity is to make light intensities of the two light beams to be close to each other. When the focused measured light passes through a plate of the thin film, a surface shape of the transmitted light wave is kept to be not changed except for the decrease of energy. In dispersion spot region with a aberration, a diffraction occurs at the pinhole nearby the focus to generate an ideal standard spherical wave as a reference light wave in the measurement, which forms an interference fringe along with the transmitted measured light. Information about the measured wave front may be obtained by analyzing a shape of the interference fringe. Such an interferometer has a simple structure and a basic principle. Since a common light path arrangement is utilized, the influence from the environment is small. Its disadvantage is a lower usage of the light energy and a measurement of phase shift can't be done at the same which, so that it is difficult to improve the precision.

In 1996, H. Medecki, E. Tejnil, et. al. of Lawrence Berkeley National Laboratory of USA propose a concept of phase-shifting point-diffraction interferometer (PS-PDI). That is to say, on the basis of the point diffraction interferometer, a diffraction grating is introduced to function as a dispersing element and a translucent mask of an imaging plane is replaced with an opaque mask, so that the property of the point diffraction interferometer is greatly improved. For a basic structure of such a point diffraction interferometer, when an irradiation spherical wave is incidence on a phase shift grating to form different orders of diffraction; they passes through the measured system and are focused onto different positions of the image plane. A spatial filter is positioned on the image plane so that the light of the zeroth diffraction order carrying information about the measured system directly passes through the spatial filter via a square hole, the light of the first diffraction order is diffracted and filtered by the pinhole to generate an ideal reference spherical wave; and the light of the remaining other diffraction orders are absorbed. Thus, the interference fringe of the two light beams is obtained on the detector (CCD). When the grating is moved along an up-down direction, a phase change is occurred between the two light beams so that a phase shift and interference measurement can be implemented.

In order to meet the requirement of measurement for an extreme ultraviolet (EUV) photolithography system, since 1996, the researchers from the Lawrence Berkeley National Laboratory employ a synchrotron radiation light source of 13.4 nm to successfully develop an EUV phase-shift point-diffraction interferometer, which improves the measuring precision of the EUV system to an order of sub-nanometer and eliminates barrier for the development of the EUV photolithography.

Since the end of the last century, researchers in Japanese started to research a point diffraction interferometer. In order to detect an EUV photolithography system, association of super-advanced electronics technology (ASET), Nikon Co. and the like research the point diffraction interferometer. One type of the employed point diffraction interferometer utilizes a reflecting plate with an pinhole. One part of the diffraction spherical wave of the pinhole functions as a reference light wave, and the other part of the diffraction spherical wave is reflected by the measured plane and the reflecting plane, and then interference with the reference light. Since such an arrangement is not a system with a common light path, the requirements on the coherence of the light source and the stability of the environment are higher, and all of the measurements should be done at an anti-vibration and nitrogen-filled environment.

With a continued development of science and technique, an optical system with a large-diameter aperture are widely applied to a high technique filed such as astro optics, space optics, detection and identification of spatial object, inertial confinement fusion and so on. Thus, the manufacturing of the optical element with a large-diameter aperture needs detection methods and equipments which adapts such an optical elements.

At present, an optical element with a large-diameter aperture usually employs a phase shift interferometer, and its quality of the machined surface is determined by the phase shift interferometer. Thus, it is desired to have a standard surface shape, the size of which is identical to or larger than that of the measured element. However, for such a standard surface with a high precision, it is difficult to manufacture for a long period of manufacturing and at a high cost, which virtually increases cost and difficulty of detection. In order to find a detection means at a low cost, a technical solution of stitching sub-aperture is developed in 1980s overseas. That is to say, an interferometer with a small-diameter aperture, a high precision and a high resolution is used to recovery a wave front phase data for an optical element with a large-diameter aperture by a corresponding stitching technique. Such a technique is a novel detection means with a high precision and a large-diameter aperture, which reserves a high precision of interference measurement and avoids use of a standard wave surface, the size of which is identical that of a full aperture of an pinhole so as to greatly reduce the cost and to obtain a high frequency information cut off by the interferometer with a large-diameter aperture.

The concept of measurement of sub-aperture is proposed in 1982 by C. J. Kim in Arizona optical center, USA, which utilizes an array of reflecting mirrors with a small-diameter aperture to replace the reflecting mirror with a large-diameter aperture so as to implement a self-collimated inspection of a parabolic mirror. At early days of 1990s, such a technique is gradually applied to a stage of application and research with the continued developments of computer control and data processing technique. S. T. Theodore applies the measurement of sub-aperture to an improved Ritchey-common configuration which has a shorter light path than a conventional Ritchey-common configuration and may effectively reduce influence of atmospheric disturbance. The diameter of light beam returned to the optical element is smaller than that of the measured light beam.

The stitching algorithm developed during such a period minimize mismatch of the overlapped regions of the plurality of sub-apertures to obtain a reconstruction of the surface shape for a full pinhole with a high spatial resolution. In addition, an introduction of averaging of error greatly improves the precision of the stitching algorithm. These relevant techniques are mainly applied to an inspection of a surface shape with a large-diameter aperture so as to extend a lateral dynamic range.

In 1997, M. Bray manufactured a practical sub-aperture stitching interferometer for detection of an optical plane element with a large-diameter aperture. In several subsequent years, M. Bray introduced a concept of power spectral density to analyze the characteristic of a stitching interferometer. It indicates that it may accurately describe a stitching "noise" caused by an pinhole edge effect.

In 2003, the QED Technology Co. of USA successfully developed a SSI automatically stitching interferometer which is capable of detecting a plane surface, a spherical surface and an aspheric surface having an appropriate deviation and an aperture within 200 mm under a high precision. Such a stitching algorithm inherits an advantage of the forepart algorithm and further compensates a system error besides the relative adjustment error corrected by the conventional algorithm, which further improves the precision of stitching.

In China, a research on a measurement of sub-apertures starts at beginning of 1990s and is mainly used for detection of an optical plane element having a large-diameter aperture. Researchers in Nanjing University of Science and Technology apply the measuring technique of a sub-apertures to a phase shift plane interferometer, thereby to extend the measuring range of the pinhole from about 250 mm to about 500 mm.

During the last a few years in 1990s, researchers in State key laboratory on modern optical instruments in Zhejiang University utilized an sub-aperture detection method to verifies a RC optical system for some earth resources satellite and proposes a method of analyzing the stitched object by a function to reduce the error accumulation and error transfer caused by pair wise stitching between the sub-apertures.

As can be seen from the development and principle of the point diffraction interferometer, the point diffraction interferometer utilizes an ideal spherical wave generated by an pinhole to measure. Since the resolution of a detector is limited, the resolution of measurements is decreases as the detection aperture is increased. It is desired a higher lateral resolution for more and more complex surface shapes.

SUMMARY

The lateral resolution of the measurement may be further improved by adding a stitching means to the existed point diffraction interferometer so as to test complex aspheric mirror and free-form surface.

In the present disclosure, three optical adjustable shelves which may be rotated and moved in translation are added. A stitching measurement around the aperture and a sub-apertures stitching measurement may be implemented by rotating and moving in translation the adjustable shelved, so that a conventional point diffraction interferometer may be used to detect a surface shape with a larger aperture and to obtain information about a more complex surface shape. Thus, the lateral resolution of the measurement is improved.

In order to overcome the deficiency of the prior art, the object of the present disclosure is to provide detection devices and methods using a diffraction wavefront of a pinhole stitching measurement of surface shape so as to improve a lateral resolution of a measurement for a point diffraction interferometer and to provide a measurement for a large-diameter aperture and a complex lens shape.

In order to arrive the object as mentioned above, the present disclosure provide a detection device for measuring an optical surface shape of a diffraction spherical wave of an pinhole, which comprises: a laser, a filter hole, a first condenser lens, a spatial filter, a beam expander a half wave plate, a $\lambda/4$ wave plate, an attention plate, a beam splitter, a reflecting mirror, a phase shifter, a first optical adjustable shelf, a second set of condenser lens, a pinhole substrate, a second optical adjustable shelf, a third optical adjustable shelf, a CCD detector and a computer.

The laser is configured to emit a laser light to function as an illumination light source.

The filter hole is configured to scatter the light emitted by the laser by utilizing a diffraction effect.

The first condenser lens is configured to collect the scattered light exited from the filter hole.

The spatial filter is configured to filter a stray light from the light collected by the condenser lens.

The beam expander is configured to transform the light of a spot light source filtered by the spatial filter to be a parallel light.

The half wave plate is configured to rotate a polarization direction of the parallel light formed by the beam expander.

The $\lambda/4$ wave plate is configured to regulate the light in conjunction with the half wave plate to generate a circular polarized light.

The attention plate is configured to adjust a light intensity.

The beam splitter is configured to control a propagation direction of the light beam, the beam splitter transmitting the light transmitted through the attention plate and reflecting the light reflected by the reflecting mirror.

The reflecting mirror is configured to reflect the light beam and configured to shift a phase of the light.

The phase shifter is coupled to the reflecting mirror, and a movement of the phase shifter is controlled by the computer to generate a phase shift.

The first optical adjustable shelf is coupled to the second set of condenser lens and the pinhole substrate, and the second set of condenser lens and the pinhole are controlled to move and rotate for stitching measurement.

The second set of condenser lens is configured to focus the light reflected by the beam splitter on the pinhole within the pinhole substrate.

The pinhole substrate is configured to generate a diffraction spherical wave, and a portion of pinhole substrate except the pinhole is coated with a reflecting film to reflect the measured light.

The second optical adjustable shelf, on which a mirror to be measured is positioned, is configured to adjust the mirror to be measured to move and incline.

The third optical adjustable shelf, on which a third set of condenser lens is positioned, is configured to project an interference light to the CCD detector to form and record an interference fringe.

The computer is connected to the CCD detector and is configured to store and process the interference fringe recorded by the CCD detector. The computer is configured to control the movement of the second optical adjustable shelf to implement an annular aperture stitching, and the computer is configured to control a movement of the first optical adjustable shelf and to scan and stitch to measure the mirror on the second optical adjustable shelf.

The filter hole is positioned at a light exit of the laser. The first condenser lens is positioned between the filter hole and the spatial filter. The filter hole is positioned at an object plane of the first condenser lens. The spatial filter is positioned at an image plane of the first condenser lens. The spatial filter is also positioned at a front focus of the beam expander. The half wave plate, the λ/4 wave plate and the attention plate are positioned behind the beam expander in turn. The centers of the filter hole, the first condenser lens, the spatial filter, the beam expander, the half wave plate, the λ/4 wave plate, the attention plate are on the same optical axis. The half wave plate and the λ/4 wave plate are parallel to the beam expander. The attention plate is perpendicular to the optical axis. The center of the beam splitter is on the optical axis and the beam splitter forms an angle of 45 degree along with the optical axis. The reflecting mirror is positioned behind the beam splitter. The reflecting mirror is coupled to the phase shifter. The first optical adjustable shelf is parallel to the optical axis, the center of the first optical adjustable shelf is aligned with the center of the beam splitter, and the first optical adjustable shelf is configured to fasten the second set of condenser lens and the pinhole substrate and to rotate and move simultaneously. The second optical adjustable shelf is positioned at one side of pinhole in the pinhole substrate at which the diffraction wavefront is generated and on which the mirror to be measured is positioned. The third set of condenser lens is positioned on the third optical adjustable shelf, and is configured to collect interference light and to transmit the same onto the CCD detector. The CCD detector is positioned behind the third optical adjustable shelf. The computer is connected to the CCD detector.

Furthermore, the beam splitter makes a light beam incidence along one direction to be reflected and a light beam incidence along another direction to be transmitted. The beam splitter may be formed of a prism coated with a film or a plane mirror coated with a film.

Furthermore, the first optical adjustable shelf is fastened to the second set of condenser lens and the pinhole substrate, and they may be rotated and moved simultaneously.

Furthermore, the pinholes in the pinhole substrate may be uncoated, coated with an anti-reflection film or an attenuation film, and the pinhole substrate except the pinhole may be coated with a reflecting film.

Furthermore, the reflecting mirror may be a plane mirror, a set of plane mirror, a prism or combination of the same.

Furthermore, the mirror to be measured is positioned above the second optical adjustable shelf and may be rotated and moved.

Furthermore, the third optical adjustable shelf is fastened to the third set of condenser lens and the CCD detector, and may be rotated and moved.

In order to arrive the object as mentioned above, the present disclosure provides a detection method using a diffraction wavefront of a pinhole stitching measurement of surface shape, which utilizes the detection device as mentioned above, wherein the detection method uses an annular aperture stitching measurement method while the second optical adjustable shelf is moved, and comprises the following steps.

S1, the mirror to be measured is positioned on the second optical adjustable shelf; the light emitted from the laser passes through the filter hole and the divergent light passes through the first condenser lens; the light is focused by the first condenser lens to the spatial filter to filter a stray light and the beam of the light is expanded by the beam expander; the expanded light passes through the half wave plate to rotate the polarization direction of light; the linearly polarized light is converted to a circular polarized light by the λ/4 wave plate; the circular polarized light is transmitted through the attention plate and transmitted through the beam splitter; the light transmitted through the beam splitter is reflected by the reflecting mirror; the reflecting mirror is coupled by the phase shifter and is configured to generate a phase change; the light reflected by the reflecting mirror is further reflected by the beam splitter; the light reflected by the beam splitter passes through the first optical adjustable shelf and the second set of condenser lens to irradiate the pinhole in the pinhole substrate; a part of diffraction light generated by the pinhole is irradiated to the mirror to be measured on the second optical adjustable shelf; the light reflected by the mirror to be measured is reflected by a frame of the pinhole and generates a diffraction fringe along with another part of the diffraction wavefront of the pinhole; the interference fringe is focused by the third set of condenser lens on the third optical adjustable shelf and is collected by the CCD detector; the mirror to be measured is positioned on the second optical adjustable shelf, the solution of the interference fringes is resolved in the use of phase shifting method and data at the annular aperture $B_1$ is recorded.

S2, the mirror to be measured is positioned on the second optical adjustable shelf and may be moved along a normal direction of the mirror to be measured to implement an annular aperture stitching measurement; meanwhile, the phase shift method is used to resolve the interference fringes and different data $B_2, B_3, \ldots B_n$ at the annular apertures are recorded in turn.

S3, a shape of the whole surface B is resolved by utilizing a stitching algorithm based on the resolved data $B_1, B_2, \ldots B_n$ about the surface shape.

In addition, for a surface shape with a large aperture which is not easy to be moved, the detection method uses a scanning sub aperture stitching measurement to measure the surface shape while the pinhole is moved. In particularly, the detection method may comprise the following steps.

S1, the mirror to be measured is positioned on the second optical adjustable shelf; the light emitted from the laser passes through the filter hole and the divergent light passes through the first condenser lens; the light is focused by the first condenser lens to the spatial filter to filter a stray light and the beam of the light is expanded by the beam expander; the expanded light passes through the half wave plate to rotate the polarization direction of light; the linearly polarized light is converted to a circular polarized light by the λ/4 wave plate; the circular polarized light is transmitted through the attention plate and transmitted through the beam splitter; the light transmitted through the beam splitter is reflected by the reflecting mirror; the reflecting mirror is coupled by the phase shifter and is configured to generate a phase change; the light reflected by the reflecting mirror is further reflected by the beam splitter ; the light reflected by the beam splitter passes through the first optical adjustable shelf and the second set of condenser lens to irradiate the pinhole in the pinhole substrate; a part of diffraction light generated by the pinhole is irradiated to the mirror to be measured on the second optical adjustable shelf; the light reflected by the mirror to be measured is reflected by a frame of the pinhole and generate a diffraction fringe along with another part of the diffraction wavefront of the pinhole; the interference fringe is focused by the third set of condenser lens on the third optical adjustable shelf and is collected by the CCD detector; the mirror to be measured is positioned on the second optical adjustable shelf and the interference fringe at this moment is resolved by a phase shift method and the data of $C_1$ for the sub-aperture of the mirror at this moment is recorded.

S2, the mirror to be measured is positioned on the second optical adjustable shelf and is kept to be fixed, and the first optical adjustable shelf is moved and rotated ; since the second set of condenser lens and the pinhole substrate are fastened to the first optical adjustable shelf, which corresponds to that that pinhole is moved and rotated, the mirror to be measure is measured by utilizing the diffraction spherical wave generated by the pinhole to scan and stitch; meanwhile, the third optical adjustable shelf is adjusted so that the third set of condenser lens and the CCD detector are able to receive information about the interference fringe; and the phase shift method is used to parse the interference fringe and different data of $C_2, C_3, \ldots C_n$ for the sub-apertures of the mirror surface are recorded in turn.

S3, a shape of the whole surface C is resolved by utilizing a stitching algorithm based on the parsed data of $C_1, C_2, \ldots C_n$ about the surface shape.

The technical effects of the present invention are shown as follows: three optical adjustable shelves are added, rotated and moved in translation, annular aperture stitching and sub-aperture stitching can be done, respectively, so that a conventional point diffraction interferometer may be used to measure a surface shape with a larger aperture and to get information about a complex surface shape. Thus, a lateral resolution to be detected is improved.

BRIEF DESCRIPTION OF THE DRAWINGS

FIG. 7 is a schematic view of a process of measuring an optical surface shape by scanning and stitching according to the present invention, in which:

Figure 1:
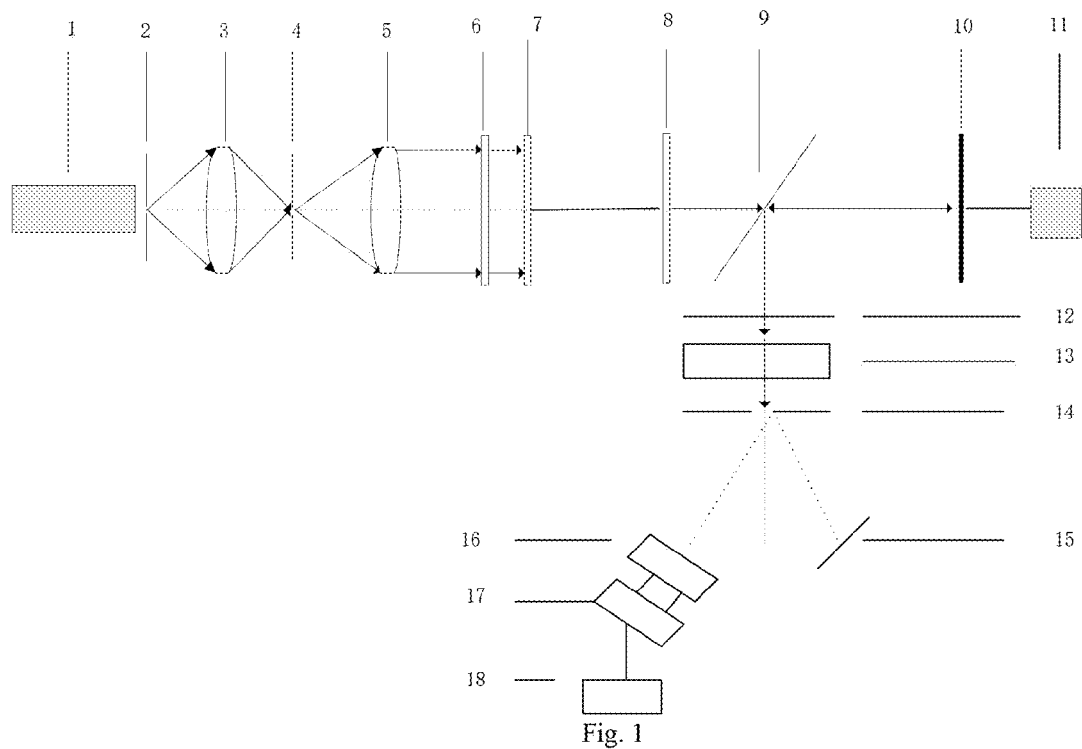
FIG. 1 is a schematic view of the arrangement of a detection device using a diffraction wavefront stitching measurement of surface shape of a pinhole according to the present invention.

1 laser
2 filter hole
3 a first condenser lens
4 spatial filter
5 beam expander
6 half wave plate
7 λ/4 wave plate
8 attention plate
9 beam splitter
10 reflecting mirror
11 phase shifter
12 a first optical adjustable shelf
13 second set of condenser lens
14 pinhole substrate
15 second optical adjustable shelf
16 third optical adjustable shelf
17 CCD detector
18 computer

DETAILED DESCRIPTION OF PREFERRED EMBODIMENTS

In order to further clarity the object, technical solution and advantages of the present invention, the present invention would be illustrated in detail by referring to the particular embodiments and the accompany figures.

FIG. 1 is a schematic view of the arrangement of a detection device using a diffraction wavefront of a pinhole stitching measurement of surface shape according to the present invention. The detection device may comprise a laser 1, a filter hole 2, a first condenser lens 3, a spatial filter 4, a beam expander 5, a half wave plate 6, a λ/4 wave plate 7, an attention plate 8, a beam splitter 9, a reflecting mirror 10, a phase shifter 11, a first optical adjustable shelf 12, a second set of condenser lens 13, an pinhole substrate 14, a second optical adjustable shelf 15, a third optical adjustable shelf 16, a CCD detector 17 and a computer 18. The filter hole 2 is positioned at a light exit of the laser 1. The first condenser lens 3 is positioned between the filter hole 2 and the spatial filter 4. The location for positioning the filter hole 2 is at an object plane of the first condenser lens 3. The spatial filter 4 is positioned at an imaging plane of the first condenser lens 3. The spatial filter 4 is also positioned at a front focus of the beam expander 5. The half wave plate 6, the λ/4 wave plate 7 and the attention plate 8 are positioned behide the beam expander 5 in turn. The centers of the filter hole 2, the first condenser lens 3, the spatial filter 4, the beam expander 5, the half wave plate 6, the λ/4 wave plate 7, the attention plate 8 are on the same optical axis. The half wave plate 6 and the λ/4 wave plate 7 are parallel to the beam expander 5. The attention plate 8 is perpendicular to the optical axis. The center of the beam splitter 9 is on the optical axis and the beam splitter forms an angle of 45 degree along with the optical axis. The reflecting mirror 10 is positioned behind the beam splitter 9. The reflecting mirror 10 is coupled to the phase shifter 11. The first optical adjustable shelf 12 is parallel to the optical axis. The center of the first optical adjustable shelf 12 is aligned with the center of the beam splitter 9. The first optical adjustable shelf 12 is configured to fasten the second set of condenser lens 13 and the pinhole substrate 14 and to rotate and move simultaneously. The second optical adjustable shelf 15 is positioned at one side of pinhole in the pinhole substrate 14 at which the diffraction wavefront is generated and on which the mirror to be measured is positioned. The third set of condenser lens is positioned on the third optical adjustable shelf 16, and is configured to collect interference light and to transmit the same onto the CCD detector 17. The CCD detector 17 is positioned behind the third optical adjustable shelf 16. The computer 18 is connected to the CCD detector 17.

The laser 1 is configured to emit a laser light to function as an illumination light source. The filter hole 2 is configured to scatter the light emitted by the laser 1 by utilizing a diffraction effect. The first condenser lens 3 is configured to collect the scattered light exited from the filter hole 2. The spatial filter 4 is configured to filter a stray light from the light collected by the condenser lens 3. The beam expander 5 is configured to transform the light of a spot light source filtered by the spatial filter 4 to be a parallel light. The half wave plate 6 is configured to rotate a polarization direction of the parallel light formed by the beam expander 5. The λ/4 wave plate 7 is configured to regulate the light in conjunction with the half wave plate 6 to generate a circular polarized light. The attention plate 8 is configured to adjust a light intensity. The beam splitter 9 is configured to control a propagation direction of the light beam, the beam splitter 9 transmitting the light transmitted through the attention plate 8 and reflecting the light reflected by the reflecting mirror 10. The reflecting mirror 10 is configured to reflect the light beam and configured to shift a phase of the light. The phase shifter 11 is coupled to the reflecting mirror 10, and a movement of the phase shifter 11 is controlled by the computer 18 to generate a phase shift. The first optical adjustable shelf 12 is coupled to the second set of condenser lens 13 and the pinhole substrate 14, and the second set of condenser lens 13 and the pinhole 14 are controlled to move and rotate for stitching measurement. The second set of condenser lens 13 is configured to focus the light reflected by the beam splitter 9 on the pinhole within the pinhole substrate 14. The pinhole substrate 14 is configured to generate a diffraction spherical wave, and a portion of pinhole substrate except the pinhole is coated with a reflecting film to reflect the measured light. The second optical adjustable shelf 15, on which a mirror to be measured is positioned, is configured to adjust the mirror to be measured to move and incline. The third optical adjustable shelf 16, on which a third set of condenser lens is positioned, is configured to project an interference light to the CCD detector 17 to form and record an interference fringe. The computer 18 is connected to the CCD detector 17, and is configured to store and process the interference fringe recorded by the CCD detector 17. The computer is configured to control the movement of the second optical adjustable shelf 15 to implement a annular aperture stitching, and the computer is configured to control a movement of the first optical adjustable shelf 12 and to measure the mirror to be measured on the second optical adjustable shelf 15 by scanning and stitching.

The beam splitter 9 makes a light beam incidence along one direction to be reflected and a light beam incidence along another direction to be transmitted. The beam splitter 9 is formed of a prism coated with a film or a plane mirror coated with a film.

The first optical adjustable shelf 12 is fastened to the second set of condenser lens 13 and the pinhole substrate 14, and they may be rotated and moved simultaneously.

The pinhole in the pinhole substrate 14 may be uncoated, coated with an anti-reflection film or an attenuation film. Meanwhile, the pinhole substrate except the pinhole may be coated with a reflecting film.

The reflecting mirror 10 may be a plane mirror, a set of plane mirror, a prism or combination of the same.

The mirror to be measured may be positioned above the second optical adjustable shelf 15 and may be rotated and moved simultaneously.

The third optical adjustable shelf 16 is fastened to the third set of condenser lens and the CCD detector 17, and may be rotated and moved simultaneously.

Figure 2:
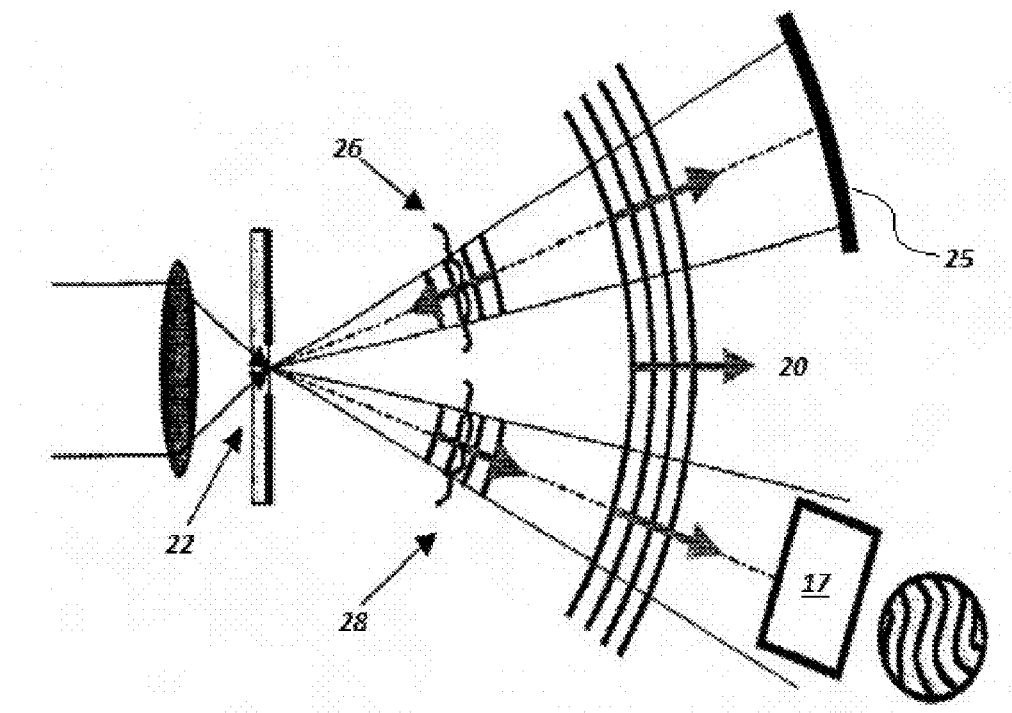
FIG. 2 is a schematic view of interference by diffraction wave of the pinhole and the mirror to be measured.
Figure 3:
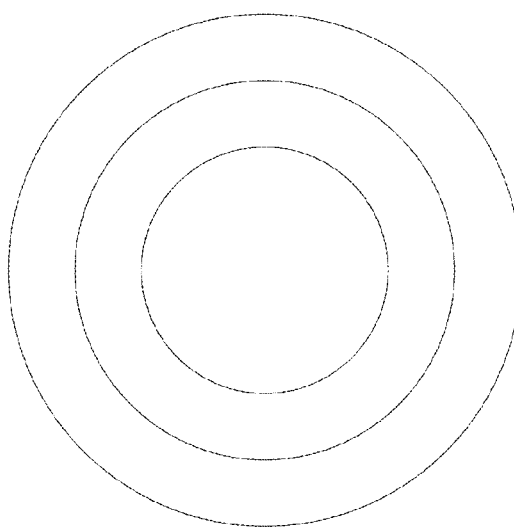
FIG. 3 is a schematic view of rings during a process of annular aperture stitching.
Figure 4:
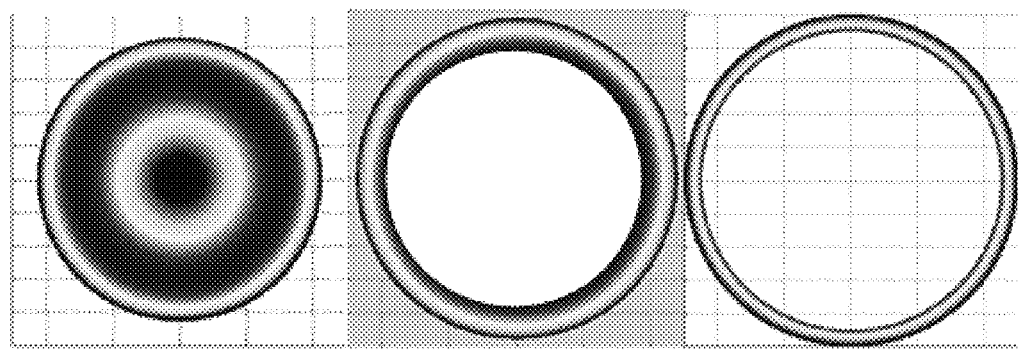
FIG. 4 is a schematic view of the measuring results of a plurality of rings during a process of annular aperture stitching.
Figure 5:
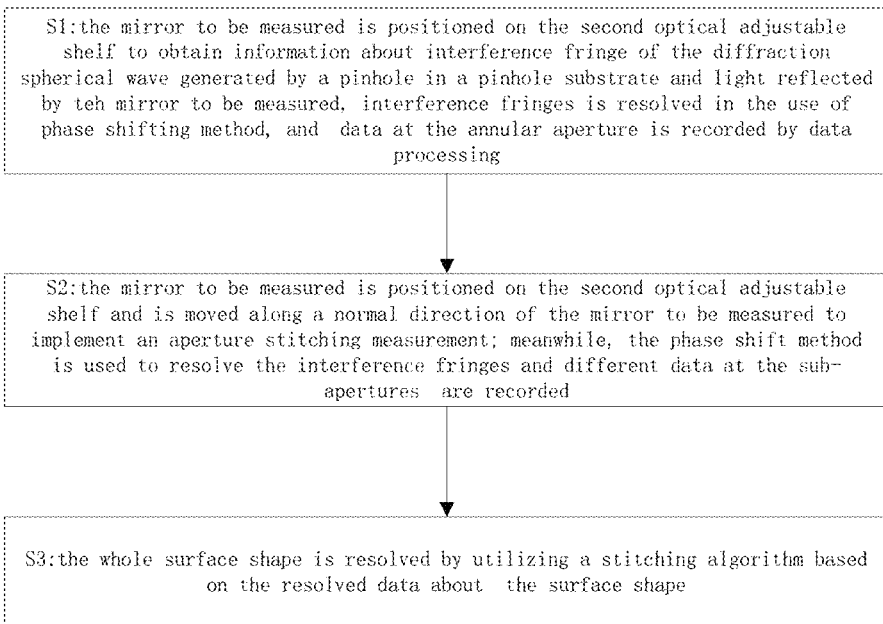
FIG. 5 is a flowchart of a detection method for measuring an optical surface shape by annular aperture stitching according to the present invention.

A measurement method of annular aperture stitching is employed when a surface shape is detected. The detection device as shown in FIG. 1 is utilized when it is measured. The light emitted from the laser 1 passes through the filter hole 2 and the divergent light passes through the first condenser lens 3. The light is focused by the first condenser lens 3 to the spatial filter 4 to filter a stray light and the beam of the light is expanded by the beam expander 5. The expanded light passes through the half wave plate 6 to rotate the polarization direction of light. The linearly polarized light is converted to a circular polarized light by the λ/4 wave plate 7. The circular polarized light is transmitted through the attention plate 8 and transmitted through the beam splitter 9. The light transmitted through the beam splitter 9 is reflected by the reflecting mirror 10. The reflecting mirror 10 is coupled by the phase shifter 11 and is configured to generate a phase change. The light reflected by the reflecting mirror 10 is further reflected by the beam splitter 9. The light reflected by the beam splitter 9 passes through the first optical adjustable shelf 12 and the second set of condenser lens 13 to irradiate the pinhole in the pinhole substrate 14. A part of diffraction light generated by the pinhole is irradiated to the mirror to be measured on the second optical adjustable shelf 15. The light reflected by the mirror to be measured is reflected by a frame of the pinhole and generate an interference fringe along with another part of the diffraction wavefront of the pinhole. The principle of the interference process is shown in FIG. 2. FIG. 2 shows a conventional point diffraction interferometer. A diffraction spherical wave 20 is generated by a pinhole 22. One part of the wavefront is irradiated to the mirror to be measured 25 and is reflected to generate a wave front 26 containing an aberration of the mirror to be measured. Such information of this part of wavefront is reflected by the pinhole substrate and is intervened with the other part of the original diffraction spherical wave 20 to generate a desired interference fringe 28. The interference fringe is focused by the third set of condenser lens on the third optical adjustable shelf 16 and is collected by the CCD detector 17, as shown in FIG. 3. The mirror to be measured is positioned on the second optical adjustable shelf 15 and may be moved along a normal direction of the mirror to be measured to implement an annular aperture stitching measurement of, as shown in FIG. 4. By utilizing a movement of the second optical adjustable shelf 15, FIG. 5 shows a flowchart of a detection method for measuring an optical surface shape by using an annular aperture stitching measurement according to the present invention. The detection method comprises the following steps.

S1, the mirror to be measured is positioned on the second optical adjustable shelf 15. The light emitted from the laser 1 passes through the filter hole 2 and the divergent light passes through the first condenser lens 3. The light is focused by the first condenser lens 3 to the spatial filter 4 to filter a stray light and the beam of the light is expanded by the beam expander 5. The expanded light passes through the half wave plate 6 to rotate the polarization direction of light. The linearly polarized light is converted to a circular polarized light by the λ/4 wave plate 7. The circular polarized light is transmitted through the attention plate 8 and transmitted through the beam splitter 9. The light transmitted through the beam splitter 9 is reflected by the reflecting mirror 10. The reflecting mirror 10 is coupled by the phase shifter 11 and is configured to generate a phase change. The light reflected by the reflecting mirror 10 is further reflected by the beam splitter 9. The light reflected by the beam splitter 9 passes through the first optical adjustable shelf 12 and the second set of condenser lens 13 to irradiate the pinhole in the pinhole substrate 14; a part of diffraction light generated by the pinhole is irradiated to the mirror to be measured on the second optical adjustable shelf 15. The light reflected by the mirror to be measured is reflected by a frame of the pinhole and generate a diffraction fringe along with another part of the diffraction wavefront of the pinhole. The interference fringe is focused by the third set of condenser lens on the third optical adjustable shelf 16 and is collected by the CCD detector 17. The mirror to be measured is positioned on the second optical adjustable shelf 15 and the solution of the interference fringe is resolved in the use of a phase shifting method and data at the annular aperture $B_1$ is recorded, as shown in FIG. 3.

S2, the mirror to be measured is positioned on the second optical adjustable shelf 15 and is moved along a normal direction of the mirror to be measured to implement an annular aperture stitching measurement; meanwhile, the phase shift method is used to resolve the interference fringes and different data $B_2, B_3, \ldots B_n$ at the annular apertures are recorded in turn, as shown in FIG. 4.

S3, a shape of the whole surface B is resolved by utilizing a stitching algorithm based on the resolved data of $B_1$, $B_2, \ldots B_n$ about the surface shape.

Figure 6:
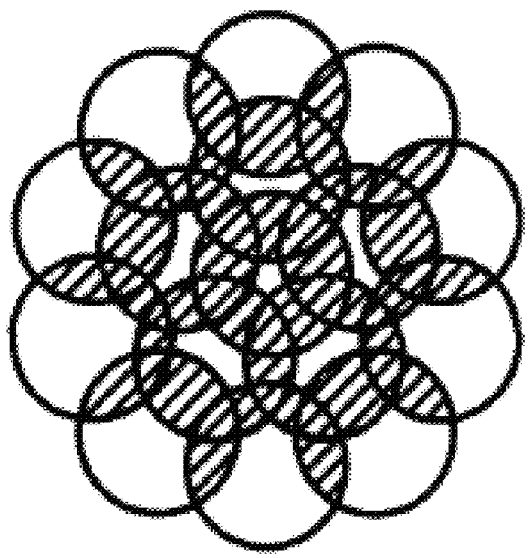
FIG. 6 is a schematic view of a process of measuring an optical surface shape by scanning and stitching according to the present invention.

For a surface shape with a large aperture which is not easy to be moved, the detection method uses an sub aperture stitching measurement method by using pinhole diffraction wavefront while the pinhole is moved and the detection device as shown in FIG. 1 is used. The light emitted from the laser 1 passes through the filter hole 2 and the divergent light passes through the first condenser lens 3. The light is focused by the first condenser lens 3 to the spatial filter 4 to filter a stray light and the beam of the light is expanded by the beam expander 5. The expanded light passes through the half wave plate 6 to rotate the polarization direction of light. The linearly polarized light is converted to a circular polarized light by the λ/4 wave plate 7. The circular polarized light is transmitted through the attention plate 8 and transmitted through the beam splitter 9. The light transmitted through the beam splitter 9 is reflected by the reflecting mirror 10. The reflecting mirror 10 is coupled by the phase shifter 11 and is configured to generate a phase change. The light reflected by the reflecting mirror 10 is further reflected by the beam splitter 9. The light reflected by the beam splitter 9 passes through the first optical adjustable shelf 12 and the second set of condenser lens 13 to irradiate the pinhole in the pinhole substrate 14; a part of diffraction light generated by the pinhole is irradiated to the mirror to be measured on the second optical adjustable shelf 15. The light reflected by the mirror to be measured is reflected by a frame of the pinhole and generate a diffraction fringe along with another part of the diffraction wavefront of the pinhole. The interference fringe is focused by the third set of condenser lens on the third optical adjustable shelf 16 and is collected by the CCD detector 17. The mirror to be measured is positioned on the second optical adjustable shelf 15 and is kept to be fixed, and the first optical adjustable shelf 12 is moved and rotated. Since the second set of condenser lens 13 and the pinhole substrate 14 is fastened to the first optical adjustable shelf 12, it corresponds to that the pinhole is moved and rotated. Thus, the diffraction spherical wave generated by the pinhole is utilized to implement a sub aperture stitching measurement on the mirror to be measured. Meanwhile, the third optical adjustable shelf 16 is adjusted so that the third set of condenser lens and the CCD detector 17 may receive information about the interference fringe. The pinhole is moved to implement a stitching measurement on the surface shape, as shown in FIG. 6. FIG. 7 shows a flowchart of a detection method of measuring an optical surface shape by scanning and stitching sub apertures. The method comprises the following steps.

S1, the mirror to be measured is positioned on the second optical adjustable shelf 15. The light emitted from the laser 1 passes through the filter hole 2 and the divergent light passes through the first condenser lens 3. The light is focused by the first condenser lens 3 to the spatial filter 4 to filter a stray light and the beam of the light is expanded by the beam expander 5. The expanded light passes through the half wave plate 6 to rotate the polarization direction of light. The linearly polarized light is converted to a circular polarized light by the λ/4 wave plate 7. The circular polarized light is transmitted through the attention plate 8 and transmitted through the beam splitter 9. The light transmitted through the beam splitter 9 is reflected by the reflecting mirror 10. The reflecting mirror 10 is coupled by the phase shifter 11 and is configured to generate a phase change. The light reflected by the reflecting mirror 10 is further reflected by the beam splitter 9. The light reflected by the beam splitter 9 passes through the first optical adjustable shelf 12 and the second set of condenser lens 13 to irradiate the pinhole in the pinhole substrate 14; a part of diffraction light generated by the pinhole is irradiated to the mirror to be measured on the second optical adjustable shelf 15. The light reflected by the mirror to be measured is reflected by a frame of the pinhole and generate a diffraction fringe along with another part of the diffraction wavefront of the pinhole. The interference fringe is focused by the third set of condenser lens on the third optical adjustable shelf 16 and is collected by the CCD detector 17. The mirror to be measured is positioned on the second optical adjustable shelf 15 and the interference fringe is resolved by a phase shift method and the data of $C_1$ for the sub-aperture of the mirror surface at this moment is recorded;

S2, the mirror to be measured is positioned on the second optical adjustable shelf 15 and is kept to be fixed, and the first optical adjustable shelf 12 is moved and rotated; since the second set of condenser lens 13 and the pinhole substrate 14 are fastened to the first optical adjustable shelf 12, which corresponds to that that pinhole is moved and rotated, thereby to measure the mirror to be measured by utilizing the diffraction spherical wave generated by the pinhole to scan and stitch; meanwhile, it is desired that the third optical adjustable shelf 16 is adjusted so that the third set of condenser lens and the CCD detector 17 are able to receive information about the interference fringe; and the phase shift method is used to parse the interference fringe and different data of $C_2, C_3, \ldots C_n$ for the sub-aperture of the mirror surface are recorded in turn.

S3, a shape of the whole surface C is resolved by utilizing a stitching algorithm based on the resolved data of $C_1$, $C_2, \ldots C_n$ about the mirror surface shape.

Although the embodiments disclosed by the present invention are shown as mentioned above, the described contents are not used to limit the present invention, but to facilitate understanding of the present invention. Any modification and changes may be made in form or in detail for those skilled in the art without departing from the spirit and scope of the present invention. The scope of the present invention is only limited by the accompany claims.

What is claimed is:

1. A detection device using a diffraction wavefront of a pinhole stitching measurement of surface shape, wherein the device comprising a laser (1), a filter hole (2), a first condenser lens (3), a spatial filter (4), a beam expander (5), a half wave plate (6), a λ/4 wave plate(7), an attention plate(8), a beam splitter(9), a reflecting mirror(10), a phase shifter(11), a first optical adjustable shelf(12), a second set of condenser lens (13), a pinhole substrate(14), a second optical adjustable shelf (15), a third optical adjustable shelf(16), a CCD detector(17) and a computer (18), wherein the laser (1) is configured to emit a laser light to function as an illumination light source;

the filter hole (2) is configured to scatter the light emitted by the laser (1) by utilizing a diffraction effect;

the first condenser lens (3) is configured to collect the scattered light exited from the filter hole (2);

the spatial filter (4) is configured to filter a stray light from the light collected by the condenser lens (3);

the beam expander (5) is configured to transform the light of a spot light source filtered by the spatial filter (4) to be a parallel light;

the half wave plate (6) is configured to rotate a polarization direction of the parallel light formed by the beam expander (5);

the λ/4 wave plate (7) is configured to regulate the light in conjunction with the half wave plate (6) to generate a circular polarized light;

the attention plate (8) is configured to adjust a light intensity;

the beam splitter (9) is configured to control a propagation direction of the light beam, the beam splitter (9) transmitting the light transmitted through the attention plate (8) and reflecting the light reflected by the reflecting mirror (10);

the reflecting mirror(10) is configured to reflect the light beam and configured to shift a phase of the light;

the phase shifter (11) is coupled to the reflecting mirror (10), and a movement of the phase shifter (11) is controlled by the computer (18) to generate a phase shift;

the first optical adjustable shelf (12) is coupled to the second set of condenser lens (13) and the pinhole substrate (14), and the second set of condenser lens (13) and the pinhole in the pinhole substrate (14) are controlled to move and rotate for stitching measurement;

the second set of condenser lens (13) is configured to focus the light reflected by the beam splitter (9) on the pinhole within the pinhole substrate (14);

the pinhole substrate (14) is configured to generate a diffraction spherical wave, and a portion of pinhole substrate except the pinhole is coated with a reflecting film to reflect the measured light;

the second optical adjustable shelf (15), on which a mirror to be measured is positioned, is configured to adjust the mirror to be measured to move and incline;

the third optical adjustable shelf (16), on which a third set of condenser lens is positioned, is configured to project an interference light to the CCD detector (17) to form and record an interference fringe;

the computer (18) is connected to the CCD detector (17), is configured to store and process the interference fringe recorded by the CCD detector (17); the computer is configured to control the movement of the second optical adjustable shelf (15) to implement an annular aperture stitching, and the computer is configured to control a movement of the first optical adjustable shelf (12) and to scan and stitch to measure the mirror on the second optical adjustable shelf (15);

wherein the filter hole (2) is positioned at a light exit of the laser (1), the first condenser lens (3) is positioned between the filter hole (2) and the spatial filter (4), the filter hole (2) is positioned at an object plane of the first condenser lens (3), the spatial filter (4) is positioned at an object plane of the first condenser lens (3). The spatial filter is also positioned at a front focus of the beam expander (5), the half wave plate (6), the λ/4 wave plate (7) and the attention plate (8) are positioned behind the beam expander (5) in turn;

wherein the centers of the filter hole (2), the first condenser lens (3), the spatial filter (4), the beam expander (5), the half wave plate (6), the λ/4 wave plate (7), the attention plate (8) are on the same optical axis;

the half wave plate (6) and the λ/4 wave plate (7) are parallel to the beam expander (5);

the attention plate (8) is perpendicular to the optical axis;

the center of the beam splitter (9) is along the optical axis and the beam splitter forms an angle of 45 degree along with the optical axis;

the reflecting mirror (10) is positioned behind the beam splitter (9);

the reflecting mirror (10) is coupled to the phase shifter (11);

the first optical adjustable shelf (12) is parallel to the optical axis, the center of the first optical adjustable shelf (12) is aligned with the center of the beam splitter (9), and the first optical adjustable shelf (12) is configured to fasten the second set of condenser lens (13) and the pinhole substrate (14) and to rotate and move simultaneously;

the second optical adjustable shelf (15) is positioned at one side of pinhole in the pinhole substrate (14) at which the diffraction wavefront is generated and on which the mirror to be measured is positioned;

the third set of condenser lens is positioned on the third optical adjustable shelf (16), and is configured to collect interference light and to transmit the same onto the CCD detector (17);

the CCD detector (17) is positioned behind the third optical adjustable shelf (16); and the computer (18) is connected to the CCD detector (17).

2. The detection device according to claim 1, wherein the beam splitter (9) makes a light beam incidence along one direction to be reflected and a light beam incidence along another direction to be transmitted, the beam splitter (9) is formed of a prism coated with a film or a plane mirror coated with a film.

3. The detection device according to claim 1, wherein the first optical adjustable shelf (12) is fastened to the second set of condenser lens (13) and the pinhole substrate (14), and they may be rotated and moved simultaneously.

4. The detection device according to claim 1, wherein the pinhole in the pinhole substrate (14) is uncoated, coated with an anti-reflection film or an attenuation film, and the pinhole substrate except the pinhole is coated with a reflecting film.

5. The detection device according to claim 1, wherein the reflecting mirror is a plane mirror, a set of plane mirror, a prism or combination of the same.

6. The detection device according to claim 1, wherein the mirror to be measured is positioned above the second optical adjustable shelf (15) and is rotated and moved.

7. The detection device according to claim 1, wherein the third optical adjustable shelf (16) is fastened to the third set of condenser lens and the CCD detector (17), and is rotated and moved.

8. A detection method using a diffraction wavefront of a pinhole stitching measurement of surface shape, which utilizes the detection device according to claim 1, wherein the detection method uses an annular aperture stitching measurement method while the second optical adjustable shelf (15) is moved, comprises the following steps of:

S1, the mirror to be measured is positioned on the second optical adjustable shelf (15); the light emitted from the laser (1) passes through the filter hole (2) and the divergent light passes through the first condenser lens (3); the light is focused by the first condenser lens (3) to the spatial filter (4) to filter a stray light and the beam of the light is expanded by the beam expander (5); the expanded light passes through the half wave plate (6) to rotate the polarization direction of light; the linearly polarized light is converted to a circular polarized light by the λ/4 wave plate(7); the circular polarized light is transmitted through the attention plate (8) and transmitted through the beam splitter (9); the light transmitted through the beam splitter (9) is reflected by the reflecting mirror (10); the reflecting mirror (10) is coupled by the phase shifter (11) and is configured to generate a phase change; the light reflected by the reflecting mirror (10) is further reflected by the beam splitter (9); the light reflected by the beam splitter (9) passes through the first optical adjustable shelf (12) and the second set of condenser lens (13) to irradiate the pinhole in the pinhole substrate (14); a part of diffraction light generated by the pinhole is irradiated to the mirror to be measured on the second optical adjustable shelf (15); the light reflected by the mirror to be measured is reflected by a frame of the pinhole and generate a diffraction fringe along with another part of the diffraction wavefront of the pinhole; the interference fringe is focused by the third set of condenser lens on the third optical adjustable shelf (16) and is collected by the CCD detector (17); the mirror to be measured is positioned on the second optical adjustable shelf (15), the solution of interference fringes in the use of phase shifting method, and recording the data at the annular aperture $B_1$;

S2, the mirror to be measured is positioned on the second optical adjustable shelf (15) and is moved along a normal direction of the mirror to be measured to implement an annular aperture stitching measurement; meanwhile, the phase shift method is used to resolve the interference fringes and different data of $B_2, B_3, \ldots B_n$ at the annular apertures are recorded in turn; and S3, a shape of the whole surface B is resolved by utilizing a stitching algorithm based on the resolved data of $B_1, B_2, \ldots B_n$ about the surface shape.

9. A detection method using a diffraction wavefront of a pinhole stitching measurement of surface shape of, which utilizes the detection device according to claim 1, wherein for a surface shape with a large aperture which is not easy to be moved, the detection method uses an scanning sub aperture stitching measurement to measure the surface shape while the pinhole is moved, the detection method comprising:

S1, the mirror to be measured is positioned on the second optical adjustable shelf (15); the light emitted from the laser (1) passes through the filter hole (2) and the divergent light passes through the first condenser lens (3); the light is focused by the first condenser lens (3) to the spatial filter (4) to filter a stray light and the beam of the light is expanded by the beam expander (5); the expanded light passes through the half wave plate (6) to rotate the polarization direction of light; the linearly polarized light is converted to a circular polarized light by the λ/4 wave plate (7); the circular polarized light is transmitted through the attention plate (8) and transmitted through the beam splitter (9); the light transmitted through the beam splitter (9) is reflected by the reflecting mirror (10); the reflecting mirror (10) is coupled by the phase shifter (11) and is configured to generate a phase change;

the light reflected by the reflecting mirror (10) is further reflected by the beam splitter (9); the light reflected by the beam splitter (9) passes through the first optical adjustable shelf (12) and the second set of condenser lens (13) to irradiate the pinhole in the pinhole substrate (14); a part of diffraction light generated by the pinhole is irradiated to the mirror to be measured on the second optical adjustable shelf (15); the light reflected by the mirror to be measured is reflected by a frame of the pinhole and generate a diffraction fringe along with another part of the diffraction wavefront of the pinhole; the interference fringe is focused by the third set of condenser lens on the third optical adjustable shelf (16) and is collected by the CCD detector (17); the mirror to be measured is positioned on the second optical adjustable shelf (15) and the interference fringe at this moment is resolved by a phase shift method and the data of $C_1$ for the sub-aperture of the mirror at this moment is recorded;

S2, the mirror to be measured is positioned on the second optical adjustable shelf (15) and is kept to be fixed, and the first optical adjustable shelf (12) is moved and rotated; since the second set of condenser lens (13) and the pinhole substrate (14) are fastened to the first optical adjustable shelf (12), which corresponds to that that pinhole is moved and rotated, thereby to measure the mirror to be measured by utilizing the diffraction spherical wave generated by the pinhole to scan and stitch; meanwhile, the third optical adjustable shelf (16) is adjusted so that the third set of condenser lens and the CCD detector (17) are able to receive information about the interference fringe; and the phase shift method is used to resolve the interference fringes and different data of $C_2, C_3, \ldots C_n$ for the sub-apertures of the mirror are recorded in turn; and S3, a shape of the whole surface C is resolved by utilizing a stitching algorithm based on the resolved data of $C_1, C_2, \ldots C_n$ about the surface shape.

* * * * *

UNITED STATES PATENT AND TRADEMARK OFFICE
CERTIFICATE OF CORRECTION

PATENT NO.          : 9,250,059 B2                                    Page 1 of 1
APPLICATION NO.     : 14/695590
DATED               : February 2, 2016
INVENTOR(S)         : Jia et al.

It is certified that error appears in the above-identified patent and that said Letters Patent is hereby corrected as shown below:

<u>Title page</u>,
Item (73) Assignee: "Institute of Optics and Electronics, Chinese Academy of Science"
should read -- Institute of Optics and Electronics, Chinese Academy of Sciences --.

Signed and Sealed this
Twenty-third Day of August, 2016

Michelle K. Lee
*Director of the United States Patent and Trademark Office*